(12) United States Patent
Nakahara et al.

(10) Patent No.: US 11,121,895 B2
(45) Date of Patent: Sep. 14, 2021

(54) REPEATER AND RELAY METHOD FOR THE SAME

(71) Applicant: Mitsubishi Electric Corporation, Tokyo (JP)

(72) Inventors: Fumihiro Nakahara, Tokyo (JP); Shingo Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/257,094

(22) PCT Filed: Aug. 29, 2018

(86) PCT No.: PCT/JP2018/031849
§ 371 (c)(1),
(2) Date: Dec. 30, 2020

(87) PCT Pub. No.: WO2020/044446
PCT Pub. Date: Mar. 5, 2020

(65) Prior Publication Data
US 2021/0119838 A1    Apr. 22, 2021

(51) Int. Cl.
*H04L 25/49* (2006.01)

(52) U.S. Cl.
CPC ...... *H04L 25/4925* (2013.01); *H04L 25/4904* (2013.01)

(58) Field of Classification Search
CPC .................. H04L 25/4925; H04L 25/4904
See application file for complete search history.

(56) References Cited

U.S. PATENT DOCUMENTS

2010/0306630 A1* 12/2010 Yamada .................... H04L 1/22
714/799

FOREIGN PATENT DOCUMENTS

JP    H08-139764 A    5/1996

OTHER PUBLICATIONS

International Search Report of the International Searching Authority dated Nov. 13, 2018 for the corresponding international application No. PCT/JP2018/031849 (and English translation).

* cited by examiner

*Primary Examiner* — Nader Bolourchi
(74) *Attorney, Agent, or Firm* — Posz Law Group

(57) ABSTRACT

A repeater includes a reception unit, a permission signal generating unit that detects the state of the pulses of the signal, and generates a permission signal that permits a relay of the signal when the permission signal generating unit detects the pulses, and that inhibits the relay of the signal when the permission signal generating unit detects an end of the pulses, and a transmission unit. When detecting the end of the pulses, for the permission signal, the permission signal generating unit sets a pulse re-input monitoring period for determining whether or not the pulses of the signal are re-detected. When detecting the pulses of the signal during the pulse re-input monitoring period, the permission signal generating unit determines that the signal continues, and when not detecting the pulses of the signal, the permission signal generating units determines that the signal ends.

9 Claims, 9 Drawing Sheets

| STATE | OUTPUT FROM LATCH RESET CONTROL UNIT 11 |
|---|---|
| WAITING FOR DETECTION OF PULSE SIGNAL(INITIAL STATE) | 1 |
| WAITING FOR END OF PULSE SIGNAL | 0 |
| WAITING FOR RE-DETECTION OF PULSE SIGNAL | 0 |
| WAITING FOR TIMER | 1 |

| R | S | Q |
|---|---|---|
| 0 | 0 | NO CHANGE |
| 1 | 0 | 0 |
| 0 | 1 | 1 |
| 1 | 1 | 0 |

REPEATER AND RELAY METHOD FOR THE SAME

CROSS REFERENCE TO RELATED APPLICATION

This application is a U.S. national stage application of International Application No. PCT/JP2018/031849 filed on Aug. 29, 2018, the contents of which are incorporated herein by reference.

TECHNICAL FIELD

The present disclosure relates to a repeater that relays a signal to be transmitted between units and a relay method for the repeater.

BACKGROUND ART

In the past, a repeater has been used in order that a signal be transmitted between a plurality of units (see, for example, Patent Literature 1). Such a repeater transmits data using a data transmission scheme in which a pulse width is smaller than a code sending interval, such as a return-to-zero scheme or a bipolar scheme. The repeater using the data transmission scheme performs control for preventing noise from entering a received pulse signal.

More specifically, in order to achieve an input inhibition control that prevents noise from entering a received pulse signal as described above, after detecting the received pulse signal, the repeater constantly monitors the pulse signal to detect the end of the pulse signal. Then, when detecting the end of the pulse signal, the repeater immediately generates, only for a certain period of time, a signal that inhibits an input, and the input inhibition control is performed to inhibit a pulse input.

Furthermore, as another method of preventing noise from entering a received pulse signal, for example, a method using a low-pass filter including a resistor and a capacitor has been generally widely used.

CITATION LIST

Patent Literature

Patent Literature 1: Japanese Unexamined Patent Application Publication No. 08-139764

SUMMARY OF INVENTION

Technical Problem

However, in an existing method, if a pulse crack in which a received pulse signal is instantly divided by noise contained in a received pulse signal occurs, it is determined that the pulse signal ends and the input inhibition control is performed. Consequently, a pulse component is lost after the noise enters the pulse signal, and as a result, part of the pulse signal, which is to be repeatedly transmitted, is lost.

Furthermore, in the case of using a low-pass filter including a resistor and a capacitor, although part of a pulse signal is not lost, a given time delays before a received pulse signal is repeatedly transmitted. Therefore, the low-pass filter cannot be used in a communication system that cannot allow delay.

The present disclosure is applied to solve the above problem, and relates to a repeater that correctly transmits a received pulse signal without causing a time delay between reception and transmission, and a relay method for the repeater.

Solution to Problem

A repeater according to an embodiment of the present disclosure includes: a reception unit that receives a signal in the form of pulses; a permission signal generating unit that detects the state of the pulses of the signal, and generates a permission signal that permits a relay of the signal when the permission signal generating unit detects the pulses, and that inhibits the relay of the signal when the permission signal generating unit detects an end of the pulses; and a transmission unit that transmits the signal during a time period permitted by the permission signal. When detecting the end of the pulses, for the permission signal, the permission signal generating unit sets a pulse re-input monitoring period for determining whether or not pulses of the signal are re-detected. When detecting the pulses of the signal during the pulse re-input monitoring period, the permission signal generating unit determines that the signal continues, and when not detecting the pulses of the signal, the permission signal generating units determines that the signal ends Furthermore, a relay method for a repeater, according to another embodiment of the present disclosure, includes: a receiving step of receiving a signal in the form of pulses; a permission signal generating step of detecting a state of the pulses of the signal, and generating a permission signal that permits a relay of the signal when the pulses are detected, and that inhibits the relay of the signal when an end of the pulses is detected; and a transmitting step of transmitting the signal received during a period permitted by the permission signal. In the permission signal generating step, when the end of the pulses is detected, a pulse re-input monitoring period provided to determine whether or not pulses of the signal are re-detected is set for the permission signal; and when the pulses of the signal are detected during the pulse re-input monitoring period, it is determined that the signal continues, and when the pulses of the signal are not detected during the pulse re-input monitoring period, it is determined that the signal ends.

Advantageous Effects of Invention

As described above, according to the embodiments of the present disclosure, in the case where the pulse re-input monitoring period is set for the permission signal, and it is determined that the end of a pulse signal is detected, when pulses are detected during the pulse re-input monitoring period, it is determined that the pulse signal continues. It is therefore possible to prevent the pulse signal from losing part of the pulse signal because of a pulse crack that occurs due to noise, and thus to accurately transmit the received pulse signal without causing a time delay from reception to transmission.

DESCRIPTION OF EMBODIMENTS

Embodiment 1

A repeater according to Embodiment 1 of the present disclosure will be described. The repeater according to Embodiment 1 shapes the waveform of a received baseband signal and then sends the baseband signal.
[Configuration of Repeater 1]

Figure 1:
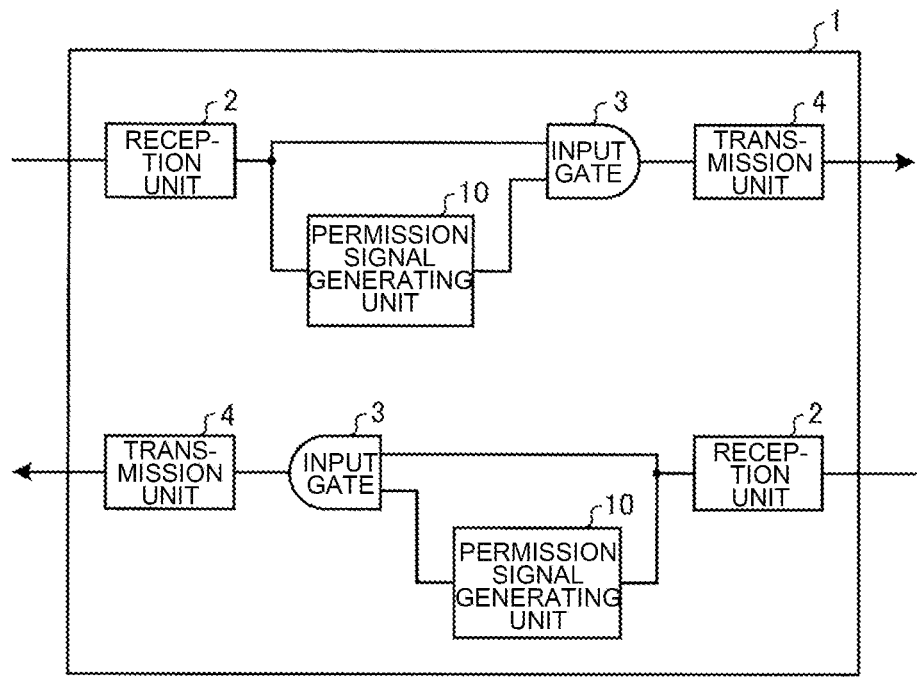
FIG. 1 is a block diagram illustrating an example of the configuration of a repeater according to Embodiment 1.

FIG. 1 is a block diagram illustrating an example of the configuration of a repeater 1 according to Embodiment 1. As illustrated in FIG. 1, the repeater 1 includes reception units 2, permission signal generating units 10, input gates 3, and transmission units 4. It should be noted that in this example, the repeater 1 has two systems, that is, a system that relays a baseband signal that is transmitted from one side to the other side and a system that relays a baseband signal that is transmitted from the above other side to the above one side. However, the system of the repeater 1 is not limited to the configuration of the above example. For example, the repeater 1 may have only one of the above two systems.

The reception unit 2 receives as an input signal, a baseband signal transmitted in the form of pulses, and shapes the waveform of the input signal. To be more specific, the reception unit 2, for example, amplifies the input signal and reverses the polarity of the input signal such that the input signal has an amplitude suitable for processing by a circuit provided in the repeater 1.

The input signal received by the reception unit 2 and a permission signal generated by the permission signal generating unit 10 are input to the input gate 3. The input gate 3 calculates a logical product of the input signal and the permission signal, and outputs the result of the calculation. That is, the input gate 3 outputs the input signal as a transmission pulse signal only during a time period permitted by the permission signal.

The transmission unit 4 receives the input signal that is output as the transmission pulse signal from the input gate 3, and shapes the waveform of the input signal. To be more specific, the transmission unit 4, for example, amplifies the received input signal and reverses the polarity of the signal such that the signal has an amplitude suitable for transmitting of the signal as a baseband signal.

The permission signal generating unit 10 detects the state of received pulses of the baseband signal, and based on the result of this detection, generates and outputs a permission signal that permits or inhibits the relay of the input signal. To be more specific, when detecting the received pulses, the permission signal generating unit 10 generates a permission signal that permits the relay of the baseband signal, and when detecting the end of the received pulses, the permission signal generating unit 10 generates a permission signal that inhibits the relay of the baseband signal.

Figure 2:
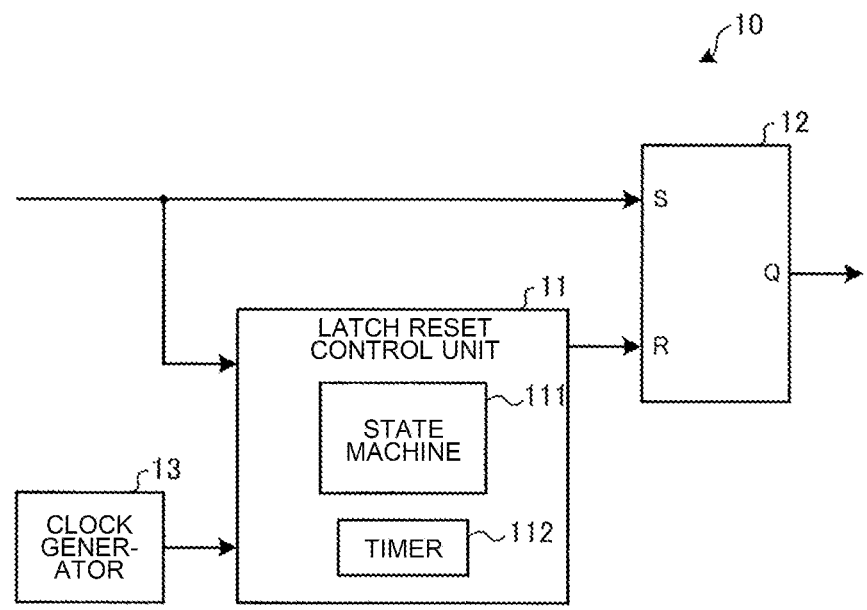
FIG. 2 is a block diagram illustrating an example of the configuration of a permission signal generating unit as illustrated in FIG. 1.

FIG. 2 is a block diagram illustrating an example of the configuration of the permission signal generating unit 10 as illustrated in FIG. 1. As illustrated in FIG. 2, the permission signal generating unit 10 includes a latch reset control unit 11, a latch circuit 12, and a clock generator 13.

The latch reset control unit 11 includes a state machine 111 and a timer 112. The latch reset control unit 11 generates a reset signal whose value indicates the state of the state machine 111 that is based on an input received pulse signal and a count value of the timer 112, and outputs the reset signal to the latch circuit 12.

The state machine 111 generates a reset signal whose value indicates the state based on the received pulses and the count value of the timer 112. The state of the state machine 111 transitions based on the state of the received pulse signal such as the start and end of the received pulse signal and the count value of the timer 112. The timer 112 counts down for time required for the transition of the state of the state machine 111.

Figures 3, 4, 5:
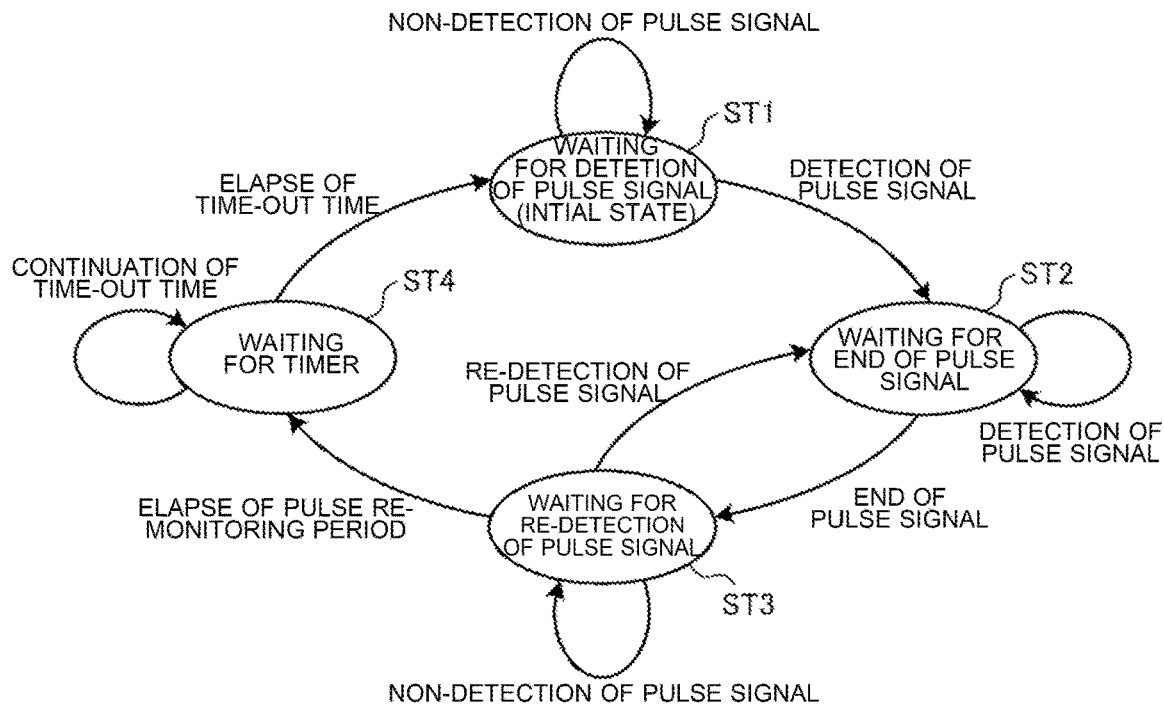
FIG. 3 is a state transition diagram illustrating a state transition of a state machine as illustrated in FIG. 2.
FIG. 4 is a schematic diagram indicating the value of a reset signal to be output from a latch reset control unit in each of states of the state machine.
FIG. 5 is a truth table of a latch circuit as illustrated in FIG. 2.

FIG. 3 is a state transition diagram indicating a state transition of the state machine 111 as illustrated in FIG. 2. FIG. 4 is a schematic diagram indicating the value of a reset signal to be output from the latch reset control unit 11 in each of states of the state machine 111. As illustrated in FIG. 3, the state of the state machine 111 transitions between a state ST1 to a state ST4 in accordance with the state of the received pulse signal and the count value of the timer 112. Furthermore, the state machine 111 outputs a reset signal whose value indicates the above state which transitions as indicated in FIG. 4.

The state ST1 is an initial state, that is, a pulse detection waiting state that is a state in which detection of a received pulse signal is waited for. This state is maintained until the received pulse signal is detected. When the state machine 111 is in the state ST1, the latch reset control unit 11 outputs a reset signal whose value is "1". When the received pulse signal is detected, the state machine 111 enters the state ST2.

The state ST2 is a pulse end waiting state that is a state in which the end of the received pulse signal is waited for. This state is maintained until the end of the received pulse signal is detected. When the state machine 111 is in the state ST2, the latch reset control unit 11 outputs a reset signal whose value is "0". When the end of the received pulse signal is detected, the state machine 111 enters the state ST3.

The state ST3 is a pulse re-detection waiting state which is a state in which re-detection of pulses of the received pulse signal is waited for. This state is maintained until a pulse re-input monitoring period set in advance elapses from the time at which the received pulse signal ends. When the state machine 111 is in the state ST3, the latch reset control unit 11 outputs a reset signal whose value is "0". When the pulse re-input monitoring period elapses, with pulses of the received pulse signal not re-detected, the state machine 111 enters the state ST4. By contrast, when pulses of the received pulse signal are re-detected during the pulse re-input monitoring period, the state machine 111 enters the state ST2.

The pulse re-input monitoring period is a time period that is set in consideration of a pulse crack of the received pulse signal that occurs if noise enters the received pulse signal. In the pulse re-input monitoring period, the timer 112 counts down. For example, the pulse re-input monitoring period is set to approximately 0.1 to 10 μ[s]. It is preferable that the pulse re-input monitoring period be set in consideration of, for example, a temporal length of actually generated noise and the timing of generation of the noise.

The state ST4 is a timer waiting state that is maintained until time-out time set in advance elapses from time at which the pulse re-input monitoring period elapses. When the state machine 111 is in the state ST4, the latch reset control unit 11 outputs a reset signal whose value is "1". When the time-out time elapses, the state machine 111 enters the state ST1.

The time-out time is time determined on the basis of time that elapses from time at which the received pulse signal ends until a received pulse signal of a subsequent bit starts. In the time-out time, the timer 112 counts down. To be more specific, in Embodiment 1, since the pulse re-input monitoring period is set after the end of the received pulse signal, the time-out time is time obtained by subtracting the pulse re-input monitoring period from the time that elapses from the time at which the received pulse signal ends until a subsequent received pulse signal starts.

The clock generator 13 as illustrated in FIG. 2 generates a clock signal that is required to cause the state machine 111 and the timer 112 of the latch reset control unit 11 to operate, and outputs the clock signal to the latch reset control unit 11. The clock signal is generated by the clock generator 13 on the basis of, for example, a system clock of the repeater 1.

The latch circuit 12 is a reset-dominant R-S latch. In the latch circuit 12, to an R terminal that is an input terminal of the latch circuit 12, a reset signal is input from the latch reset control unit 11, and to an S terminal of the latch circuit 12, a received pulse signal is input. The latch circuit 12 calculates a permission signal on the basis of signals that are input to the R terminal and the S terminal, and outputs the permission signal from a Q terminal that is an output terminal of the latch circuit 12.

FIG. 5 is a truth table of the latch circuit 12 as illustrated in FIG. 2. As indicated in FIG. 5, when the value "0" is input to each of the R terminal and the S terminal, the latch circuit 12 outputs a previous value as it is without changing the value. When the value "1" is input to the R terminal and the value "0" is input to the S terminal, the latch circuit 12 outputs the value "0". When the value "0" is input to the R terminal and the value "1" is input to the S terminal, the latch circuit 12 outputs the value "1". When the value "1" is input to each of the R terminal and the S terminal, the latch circuit 12 outputs the value "0". As described above, since the latch circuit 12 is of a reset-dominant type, when the value "1" is input to the R terminal, the latch circuit 12 necessarily outputs the value "0".

It should be noted that although it is described that the above repeater 1 is hardware that fulfills various functions, it is not limiting. For example, the repeater 1 may be a microcomputer including a central processing unit (CPU) and fulfill various functions by executing software stored in a storage such as a read only memory (ROM) not illustrated.

(Encoding Scheme for Baseband Signal)

Figure 6:
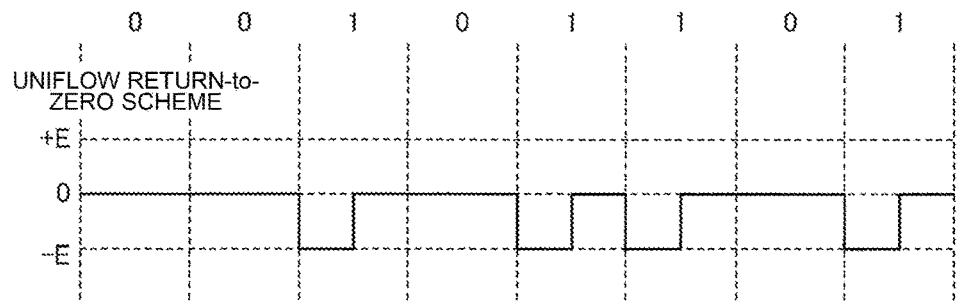
FIG. 6 is a schematic diagram illustrating an example of a baseband signal for use in Embodiment 1.

A baseband signal to be input to the repeater 1 will be described. FIG. 6 is a schematic diagram illustrating an example of a baseband signal for use in Embodiment 1. In Embodiment 1, as an encoding scheme for a baseband signal to be relayed by the repeater 1, the following scheme is used: a pulse width is reduced to be smaller than a 1-bit width to cause the potential between bits to be zero and a pulse is unipolar. For example, as illustrated in FIG. 6, a uniflow return-to-zero scheme is used as such an encoding scheme as described above. As to this example, the figure illustrates the state of a received pulse signal in the case where a baseband signal of the bit string "00101101" is input. In the uniflow return-to-zero scheme, the bit "0" is represented as the potential "0" and the bit "1" is represented as the potential "–E".

[Operation of Repeater 1]

(Pulse Relay Control)

It will be described with reference to FIG. 6 how a pulse relay control is performed by the repeater 1 in the case where a received pulse signal according to the uniflow return-to-zero scheme is input. First, before referring to the pulse relay control according to Embodiment 1, an existing pulse relay control will be described.

In the case of relaying a received pulse signal, an existing repeater uses a permission signal that determines whether to permit or inhibit the relay of a signal based on the state of the received pulse signal. The repeater thus relays a signal that is input while a permission signal permits the relay of the signal.

In the permission signal, only a certain time period immediately after the state transitions from the above permission to the above inhibition is set as a reception input inhibition period in which a signal relay is inhibited. In the reception input inhibition period, even when a signal is input, the relay of the signal is inhibited. It is therefore possible to prevent the relay of noise contained in the signal.

Figure 7:
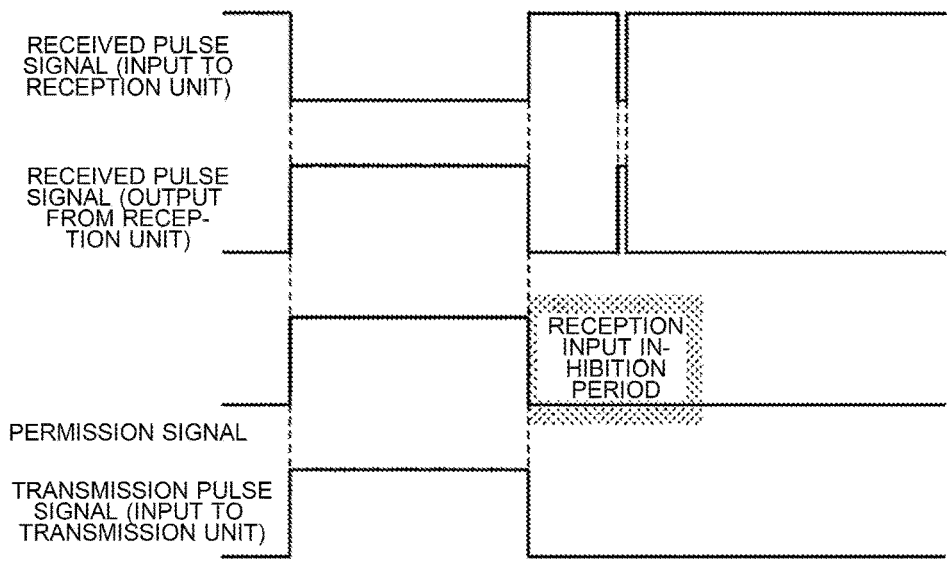
FIG. 7 is a schematic diagram illustrating a first example of the state of a signal relayed by an existing pulse relay control.

FIG. 7 is a schematic diagram illustrating a first example of the state of a signal that is relayed by an existing pulse relay control. FIG. 7 illustrates a received pulse signal that is output from the reception unit, a permission signal, and a transmission pulse signal that is input to a transmission unit of the existing repeater, in the case where the pulse signal is input to a reception unit of an existing repeater. It should be noted that in this case, it is assumed that the reception unit and the transmission unit each convert an input pulse signal such that the polarity of the pulse signal is reversed, and the same is true of FIGS. 8 and 9 as described later.

As the first example, the figure illustrates the case where noise enters a pulse signal after the pulse signal is input. Furthermore, in the first example, the permission signal is turned on when a received pulse signal is detected, whereby the signal relay is permitted. In contrast, the permission signal is turned off when the end of the received pulse signal is detected, whereby the signal relay is inhibited.

In this case, when the received pulse signal is detected, the permission signal is turned on to cause the relay of the received pulse signal to start. In contrast, when the end of the received pulse signal is detected, the permission signal is turned off to cause the relay of the received pulse signal to end.

Meanwhile, with respect to noise that is contained in the received pulse signal after the end of the received pulse signal, since the noise enters the received pulse signal during the reception input inhibition period after the permission signal is turned off, the relay of the noise is inhibited. Thus, the noise that is contained in the received pulse signal after the end of the received pulse signal is not detected as a pulse signal by mistake, and a transmission pulse signal is thus correctly relayed, with the noise removed from the received pulse signal.

Figure 8:
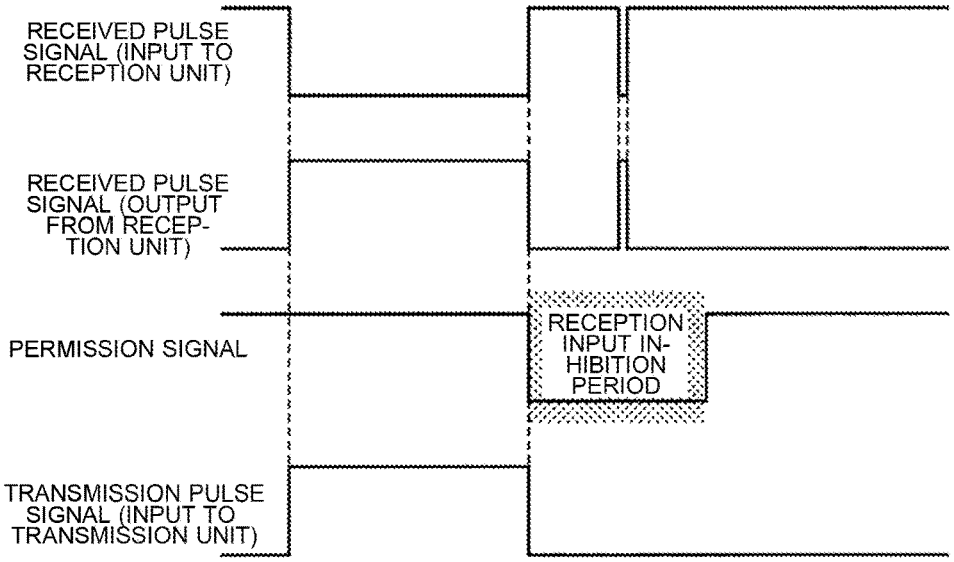
FIG. 8 is a schematic diagram illustrating a second example of the state of a signal relayed by the existing pulse relay control.

FIG. 8 is a schematic diagram illustrating a second example of the state of the signal that is relayed by the existing pulse relay control. FIG. 8, as well as FIG. 7, illustrates a received pulse signal that is output from the reception unit, a permission signal, and a transmission pulse signal that is input to the existing transmission unit, in the case where the pulse signal is input to the existing reception unit. The second example, as well as the first example, relates to the case where noise enters the received pulse signal after the input of the received pulse signal. Furthermore, in the second example, the permission signal is usually in the on state, and the signal relay permitted. The permission signal is, however, turned off when the end of the received pulse signal is detected, and the signal relay is inhibited.

In this case also, noise that enters the received pulse signal after the end of the received pulse signal is inhibited from being relayed as in the first example, since the noise enters the received pulse signal during the reception input inhibition period after the permission signal is turned off. Therefore, since the noise that enters the received pulse signal after the end of the received pulse signal means the noise that enters the received pulse signal during the reception input inhibition period, the noise is inhibited from being relayed. Thus, the transmission pulse signal is correctly relayed, with the noise removed from the received pulse signal.

Figure 9:
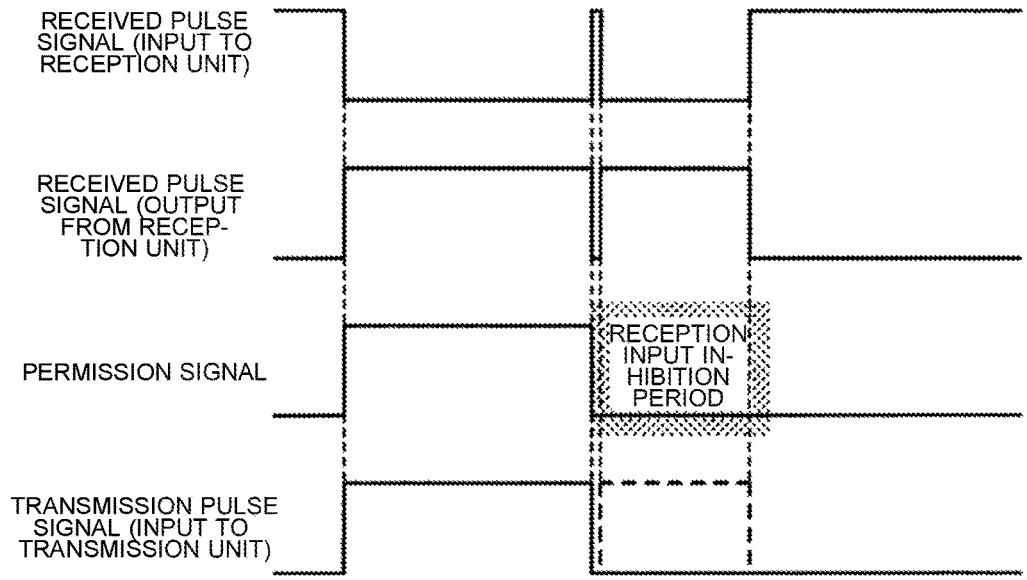
FIG. 9 is a schematic diagram illustrating a third example of the state of the signal relayed by the existing pulse relay control.

FIG. 9 is a schematic diagram illustrating a third example of the state of the signal that is relayed by the existing pulse relay control. FIG. 9, as well as FIGS. 7 and 8, illustrates a received pulse signal that is output from the reception unit, a permission signal, and a transmission pulse signal that is input to the existing transmission unit, in the case where the pulse signal is input to the existing reception unit. The third example relates to the case where noise enters a pulse signal, and a pulse crack in which the pulse signal is divided occurs. In addition, in the third example, the permission signal is turned on when the received pulse signal is detected, and the permission signal is turned off when the end of the received pulse signal is detected, as in the first example.

In this case, when the reeved pulse signal is detected, the permission signal is turned on to cause the relay of the received pulse to be started, as in the first example. In the third example, since noise enters the received pulse signal, the pulse crack occurs in the received pulse signal. Thus, it is determined that the received pulse signal ends at the time when the pulse crack occurs, whereby the permission signal is turned off to end the relay of the received pulse.

Thus, since a time period after occurrence of the pulse crack is within the reception input inhibition period, pulses of the received pulse signal are inhibited from being relayed. As a result, part of the pulse signal is missing. That is, in this case, the waveforms of the transmission pulse signal differs from that of the received pulse, and the received pulse signal cannot be correctly relayed.

As described above, in the above existing method, the input inhibition period is entered immediately when the end of a received pulse signal is detected, thereby inhibiting the signal relay. Thus, when noise enters a signal, and as a result, a pulse crack occurs in the signal, this may be erroneously detected as the end of the received pulse signal, and consequently, the signal may not be correctly relayed, for example, since pulses of the signal are missing.

Figure 10:
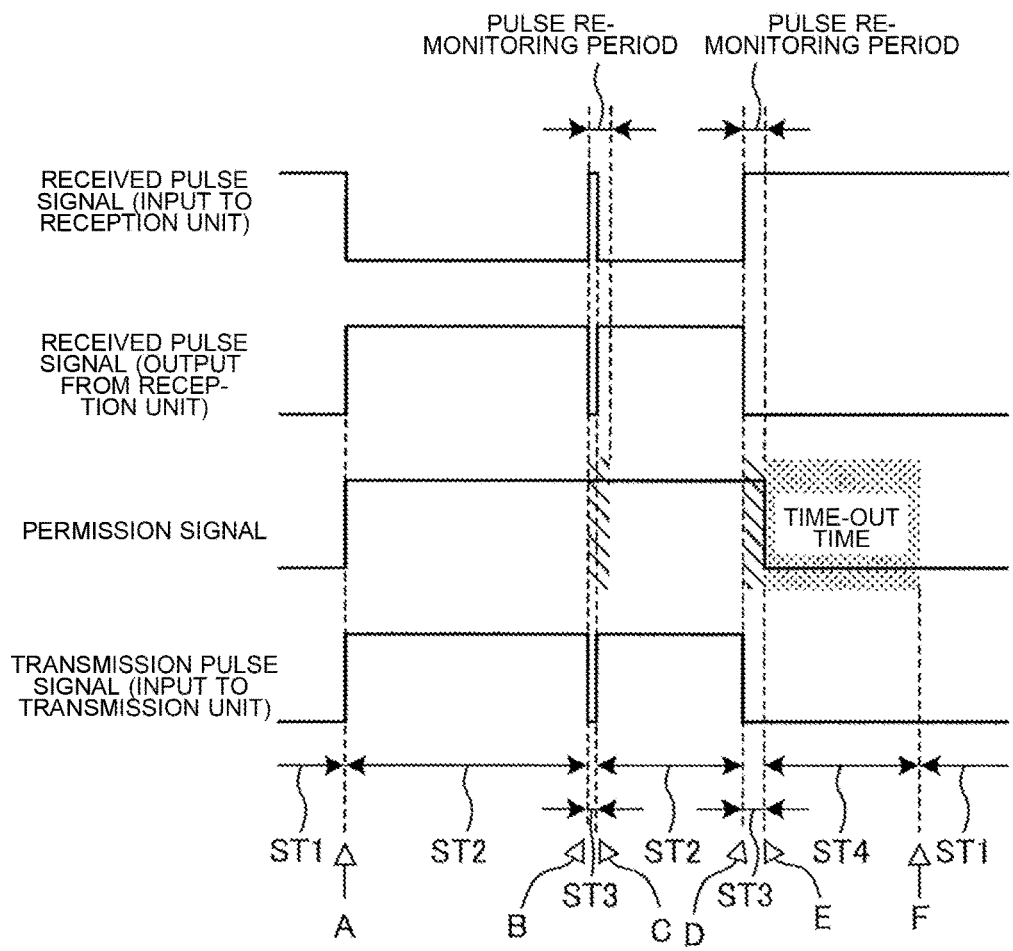
FIG. 10 is a schematic diagram illustrating an example of the state of a signal relayed by a pulse relay control according to Embodiment 1.

In view of the above, in Embodiment 1, even when a pulse crack occurs in a received pulse signal, pulses of the received pulse signal are re-detected in order to maintain the pulse signal without losing part of the pulse signal. FIG. 10 is a schematic diagram illustrating an example of the state of a signal that is relayed by the pulse relay control according to Embodiment 1. FIG. 10 illustrates a received pulse signal that is output from the reception unit 2, a permission signal, and a transmission pulse signal that is input to the transmission unit 4, in the case where the pulse signal is input to the reception unit 2 of the repeater 1. It should be noted that in this case, the reception unit 2 and the transmission unit 4 each convert the input pulse signal in such a manner as to reverse the polarity of the pulse signal. The example as illustrated in FIG. 10 relates to the case where noise enters a pulse signal, thus causing a pulse crack in which the pulse signal is divided.

In the repeater 1 according to Embodiment 1, in the relay of the received pulse signal, a permission signal is also used as in the existing repeater. According to Embodiment 1, for the permission signal, the pulse re-input monitoring period for re-detecting pulses of the received pulse signal is set after detection of the end of the received pulse signal.

When the received pulse signal is detected during the pulse re-input monitoring period, it is determined that the received pulse signal still continues and the permission signal is kept in the ON state to permit the signal relay. By contrast, when the received pulse signal is not detected during the pulse re-input monitoring period, the permission signal is turned off to inhibit the signal relay. Furthermore, immediately after the pulse re-input monitoring period elapses and the permission signal is turned off, only a certain time period is set as the time-out time.

The pulse relay control according to Embodiment 1 will be specifically described with reference to FIG. 10. First, the state machine 111 of the latch reset control unit 11 is in the state ST1 (see FIG. 3), and a permission signal is set to inhibit the signal relay. When a received pulse signal is detected at time A, the state machine 111 enters the state ST2. As a result, the permission signal is turned on to permit the signal relay.

At time B, when a pulse crack occurs in the received pulse signal due to the influence of noise contained in the signal, and it is detected as the end of the received pulse signal, the state machine 111 enters the state ST3. At this time, the timer 112 starts counting down in the pulse re-input monitoring period. Furthermore, the permission signal is kept in the ON state and the signal relay is thus also kept permitted.

When pulses of the received pulse signal are re-detected at time C before the elapse of the pulse re-input monitoring period, it is determined that the received pulse signal continues, and the state machine 111 enters the state ST2. As a result, the permission signal is kept in the ON state, and the signal relay is also kept permitted. Furthermore, the timer 112 stops counting down in the pulse re-input monitoring period, and is reset. When the end of the received pulse signal is detected at time D, the state machine 111 enters the state ST3. At this time, the timer 112 starts counting down in the pulse re-input monitoring period. Furthermore, the permission signal is kept in the ON state, and the signal relay is also kept permitted.

At time E, when the count value of the timer 112 indicates that the pulse re-input monitoring period elapses, it is determined that the received pulse signal ends, and the state machine 111 enters the state ST4. As a result, the permission signal is turned off, and the signal relay is inhibited during the time-out time. In the time-out time, the timer 112 counts down. Then, at time F, when the count value of the timer 112 indicates that the time-out time elapses, the state machine 111 enters the state ST1. As a result, the permission signal is kept in the OFF state, and the signal relay is kept inhibited until the received pulse signal is detected.

(Pulse Relay Process)

Figure 11:
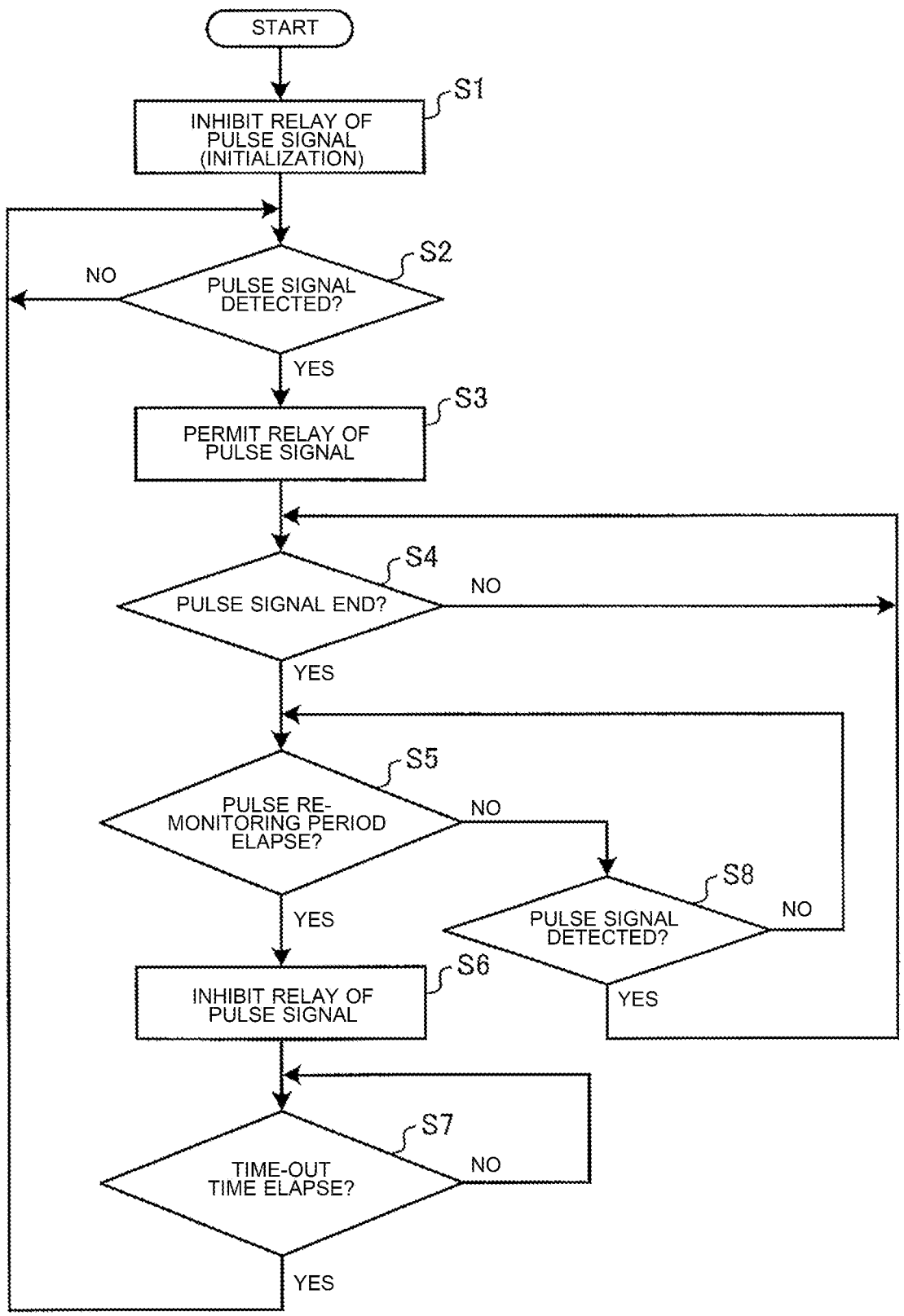
FIG. 11 is a flowchart illustrating an example of the flow of a pulse relay process by the repeater according to Embodiment 1.

FIG. 11 is a flowchart indicating an example of the flow of a pulse relay process by the repeater 1 according to Embodiment 1. In step S1, the permission signal generating unit 10 outputs a permission signal that inhibits the relay of a received pulse signal, as an initial state.

In step S2, the latch reset control unit 11 determines whether or not a received pulse signal is detected. When a received pulse signal is detected (Yes in step S2), in step S3, the permission signal generating unit 10 outputs a permission signal that permits the relay of the received pulse signal. When no received pulse signal is detected (No in step S2), the process of step S2 is repeated until a received pulse signal is detected.

In step S4, the latch reset control unit 11 determines whether or not the received pulse signal ends. When the received pulse signal ends (Yes in step S4), the process proceeds to step S5. When the received pulse signal does not end (No in step S4), the process of step S4 is repeated until the received pulse signal ends.

In step S5, the latch reset control unit 11 determines whether or not the pulse re-input monitoring period elapses. When the pulse re-input monitoring period elapses (Yes in step S5), it is determined that the received pulse signal ends, in step S6, the permission signal generating unit 10 generates a permission signal that inhibits the relay of the received pulse signal.

In step S7, the latch reset control unit 11 determines whether or not the time-out time, in which the timer 112 counts down, elapses. When the time-out time elapses (Yes in step S7), the process returns to step S2 and the above series of steps are repeated. When the time-out time does not elapse (No in step S7), the process of step S7 is repeated until the time-out time elapses.

By contrast, in step S5, when the pulse re-input monitoring period does not elapse (No in step S5), the latch reset control unit 11 determines whether or not pulses of the received pulse signal are re-detected during the pulse re-input monitoring period. When pulses of the received pulse signal are re-detected (Yes in step S8), it is determined that the received pulse signal continues and the process proceeds to step S4. When pulses of the received pulse signal are not re-detected (No in step S8), the process proceeds to step S5.

As described above, in the repeater 1 according to Embodiment 1, the pulse re-input monitoring period is set for the permission signal; and when the end of a pulse signal is detected, and pulses of the pulse signal are detected during the pulse re-input monitoring period, it is determined that the pulse signal continues. It is therefore possible to prevent the pulse signal from losing part of the pulse because of a pulse crack occurring due to noise, and thus correctly send the received pulse signal. Furthermore, the above processes are performed without using, for example, a circuit that causes occurrence of time delay, such as a low-pass filter. It is therefore possible to reduce occurrence of time delay from reception to transmission.

In addition, the repeater 1 further includes the input gate 3 that calculates a logical product of a signal and the permission signal generated by the permission signal generating unit 10. It is therefore possible to relay only a signal received during a period in which the relay is permitted, thus preventing the relay of noise that is contained in the pulse signal during a period after the end of the pulse signal.

The pulse re-input monitoring period is set to fall within the range of 0.1 to 10 μs. In general, the duration of noise that is contained in a signal is very short. Thus, even if a pulse crack occurs in a received pulse signal, the duration of the pulse crack is very short. Therefore, since the pulse re-input monitoring period is set to fall within the above range, it is possible to reliably prevent a pulse signal from losing part of the pulse signal due to a pulse crack occurring in a received pulse signal without unnecessarily increasing the monitoring period.

The permission signal generating unit 10 sets for the permission signal, time-out time during which the relay is not permitted after the pulse re-input monitoring period. As a result, it is possible to prevent the relay of noise that is contained in a received pulse signal after the end of the received pulse signal.

Embodiment 2

Next, Embodiment 2 of the present disclosure will be described. Embodiment 2 is also applicable to the case where a bipolar pulse signal having both a positive polarity and a negative polarity is input to a repeater. In this regard, Embodiment 2 is different from Embodiment 1. It should be noted that in the following description, components and portions that are the same as those in Embodiment 1 will be denoted by the same reference signs, and their detailed descriptions will thus be omitted.

[Configuration of Repeater 1A]

Figure 12:
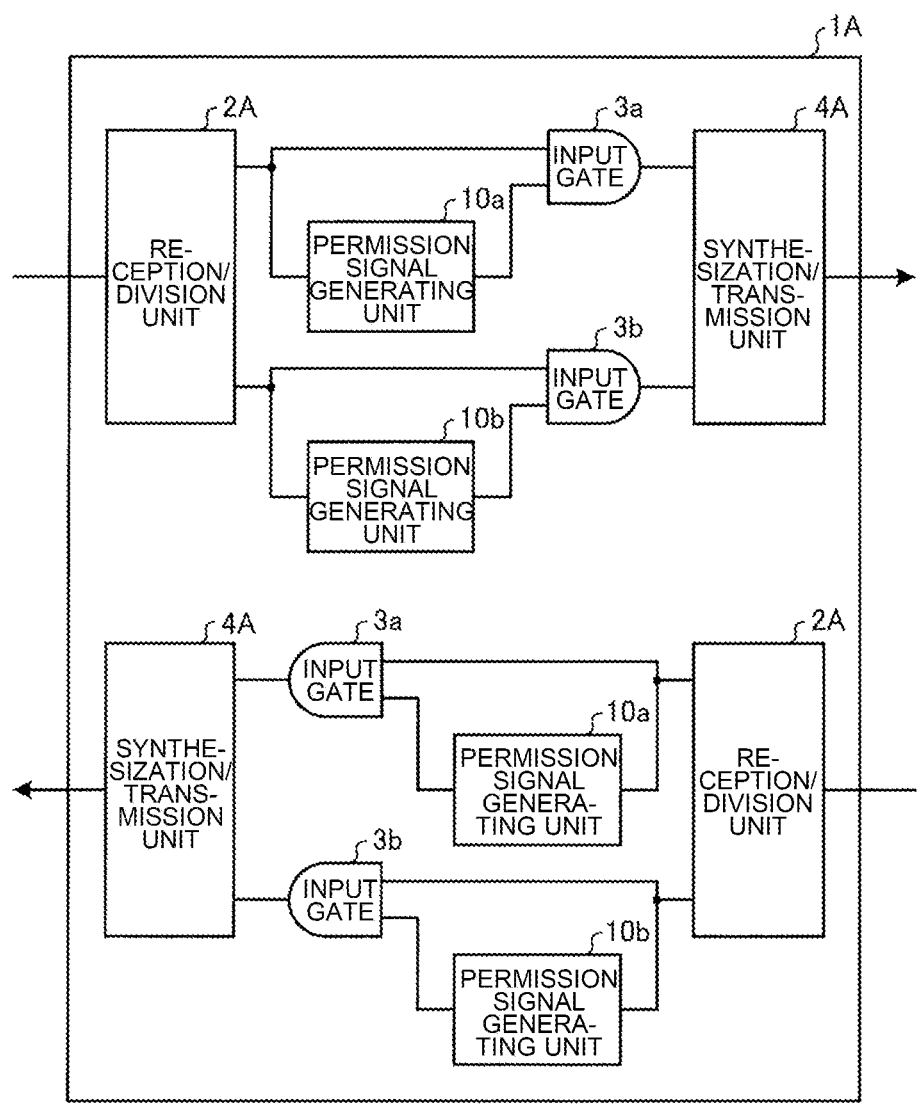
FIG. 12 is a block diagram illustrating an example of the configuration of a repeater according to Embodiment 2.

FIG. 12 is a block diagram illustrating an example of the configuration of a repeater 1A according to Embodiment 2. As illustrated in FIG. 12, the repeater 1A includes a reception/division unit 2A, permission signal generating units 10a and 10b, input gates 3a and 3b, and a synthesization/transmission unit 4A. In this example, the repeater 1A has two systems, that is, a system that relays a baseband signal that is transmitted from one side to the other side and a system that relays a baseband signal that is transmitted from the above other side to the above one side. However, the configuration of the repeater 1A is not limited to the configuration of this example. For example, the repeater 1A may have only one of the above two systems.

The reception/division unit 2A receives a baseband signal as an input pulse signal and divides the baseband signal into a positive upper received pulse signal and a negative lower received pulse signal. Furthermore, the reception/division unit 2A, for example, amplifies each of the upper received pulse signal and the lower received pulse signal such that each of the upper received pulse signal and lower received pulse signal has an amplitude suitable for processing by a circuit provided in the repeater 1A. To be more specific, the reception/division unit 2A reverses the polarity of one of the upper received pulse signal and the lower received pulse signal such that the upper and lower received pulse signals have the same polarity. For example, the reception/division unit 2A reverses the polarity of the lower received pulse signal such that the negative received pulse signal is turned into a positive received pulse signal.

The upper received pulse signal output from the reception/division unit 2A and a permission signal generated by the permission signal generating unit 10a are input to the input gate 3a. The input gate 3a calculates a logical product of the upper received pulse signal and the permission signal, and outputs the result of the calculation. That is, the input gate 3a outputs the upper received pulse signal as an upper transmission pulse signal only during a time period permitted by the permission signal.

The lower received pulse signal output from the reception/division unit 2A and a permission signal generated by the permission signal generating unit 10b are input to the input gate 3b. The input gate 3b calculates a logical product of the lower received pulse signal and the permission signal, and outputs the result of the calculation. That is, the input gate 3b outputs the lower received pulse signal as a lower transmission pulse signal only during a time period permitted by the permission signal.

The synthesization/transmission unit 4A receives the upper transmission pulse signal and the lower transmission pulse signal that are output from the input gates 3a and 3b, respectively, synthesizes the upper transmission pulse signal and the lower transmission pulse signal to obtain a transmission signal, and shapes the waveform of the obtained transmission signal. More specifically, the synthesization/transmission unit 4A reverses the polarity of one of the input upper transmission pulse signal and lower transmission pulse signal that is reversed in polarity by the reception/division unit 2A, and then synthesize the upper transmission pulse signal and the lower transmission pulse signal to obtain a transmission signal. Furthermore, the synthesization/transmission unit 4A, for example, amplifies the above obtained transmission signal such that the transmission signal has an amplitude suitable for transmitting of the transmission signal as a baseband signal.

The permission signal generating unit 10a detects the state of the input upper received pulse signal, and on the basis of the result of this detection, generates and outputs a permission signal that permits or inhibits the relay of the upper received pulse signal. To be more specific, when detecting the upper received pulse signal, the permission signal generating unit 10a generates a permission signal that permits the relay of the baseband signal, and when detecting the end of the upper received pulse signal, the permission signal generating unit 10a generates a permission signal that inhibits the relay of the baseband signal.

The permission signal generating unit 10b detects the state of the input lower received pulse signal, and on the basis of the result of this detection, generates and outputs a permission signal that permits or inhibits the relay of the lower received pulse signal. To be more specific, when detecting the lower received pulse signal, the permission signal generating unit 10b generates a permission signal that permits the relay of the baseband signal, and when detecting the end of the lower received pulse signal, the permission signal generating unit 10b generating a permission signal that inhibits the relay of the baseband signal.

It should be noted that the detailed configurations of the permission signal generating units 10a and 10b are similar to that of the permission signal generating unit 10 as illustrated in FIGS. 2 and 3, and their descriptions will thus be omitted. Furthermore, although it is described above that the permission signal generating units 10a and 10b of the above example are formed as separate units, this description is not limiting. The permission signal generating units 10a and 10b may be formed as a single unit.

(Encoding Scheme for Baseband Signal)

Figure 13:
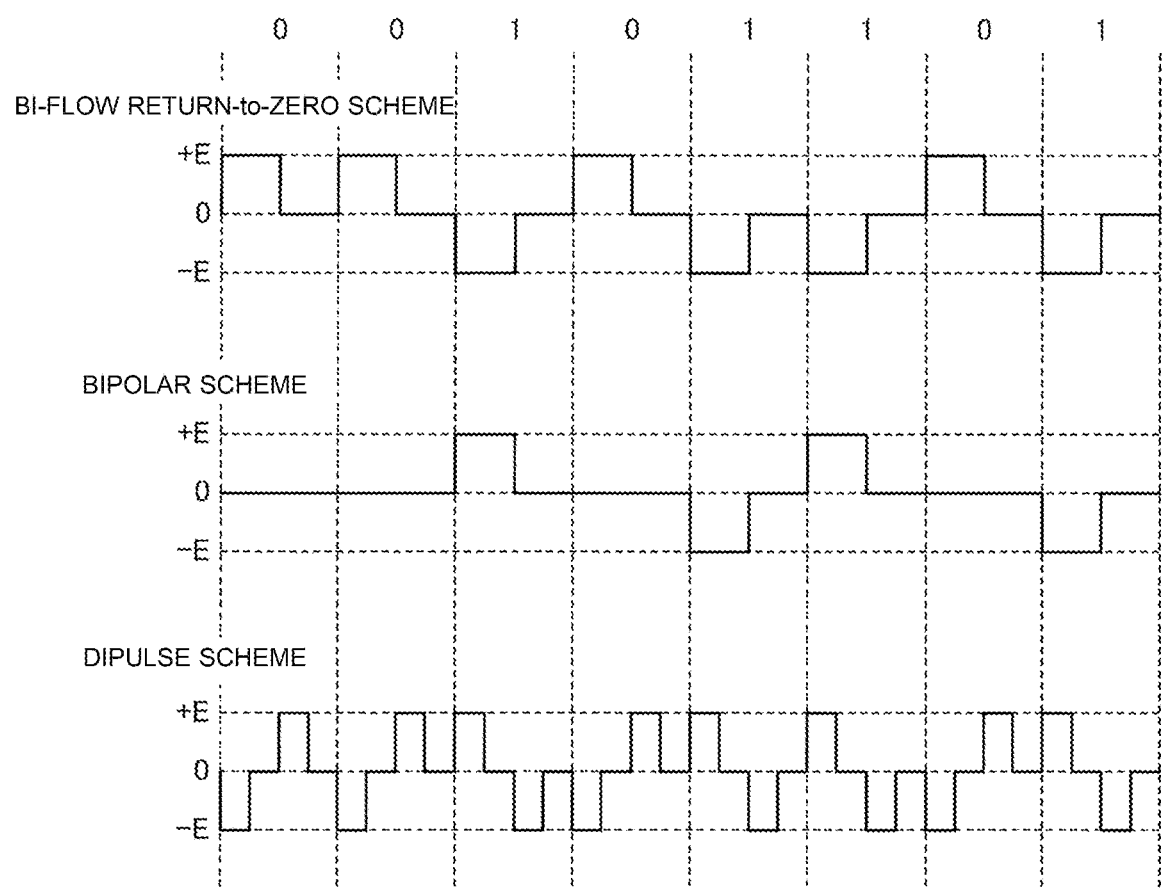
FIG. 13 is a schematic diagram illustrating an example of a baseband signal that is applied in Embodiment 2.

A baseband signal that is applicable in Embodiment 2 will be described. FIG. 13 is a schematic diagram illustrating an example of a baseband signal that is applied in Embodiment 2. In Embodiment 2, as an encoding scheme for a baseband signal to be relayed by the repeater 1A, the following scheme is used: a pulse width is reduced smaller than a 1-bit width such that the potential between bits is 0, and pulses are bipolar. For example, as such an encoding scheme, a bi-flow return-to-zero scheme, a bipolar scheme, or a dipulse scheme as illustrated in FIG. 13 is used. Regarding this example, the states of received pulse signals in the case where a baseband signal of the bit string "00101101" is input are indicated.

In the bi-flow return-to-zero scheme, the bit "0" is represented as the potential "+E", and the bit "1" is represented as the potential "−E". In the bipolar scheme, the bit "0" is represented as the potential "0", and the bit "1" is represented alternately by the potential "+E" and the potential "−E". In the dipulse scheme, bits are represented such that two bits "0" and "1" are reversed in phase.

[Operation of Repeater 1A]

(Pulse Relay Control)

The repeater 1A according to Embodiment 2 performs the pulse relay control for each of the upper received pulse signal and the lower received pulse signal as described with reference to FIG. 10, as in Embodiment 1.

As described above, in the repeater 1A according to Embodiment 2, a bipolar received pulse signal is divided into received pulse signals having different polarities, that is, an upper received pulse signal and a lower received pulse signal that have different polarities, and the upper and lower received pulse signals are each subjected to the pulse relay control. Then, an upper transmission pulse signal and a lower transmission pulse signal that are obtained through the pulse relay control are synthesized and output as a transmission pulse signal. Therefore, even in the case where a received pulse signal input to the repeater 1A is bipolar, it is possible to prevent the pulse signal from losing part of the pulse signal because of a pulse crack occurring due to noise, and correctly send the pulse signal, as in Embodiment 1.

Figure 14:
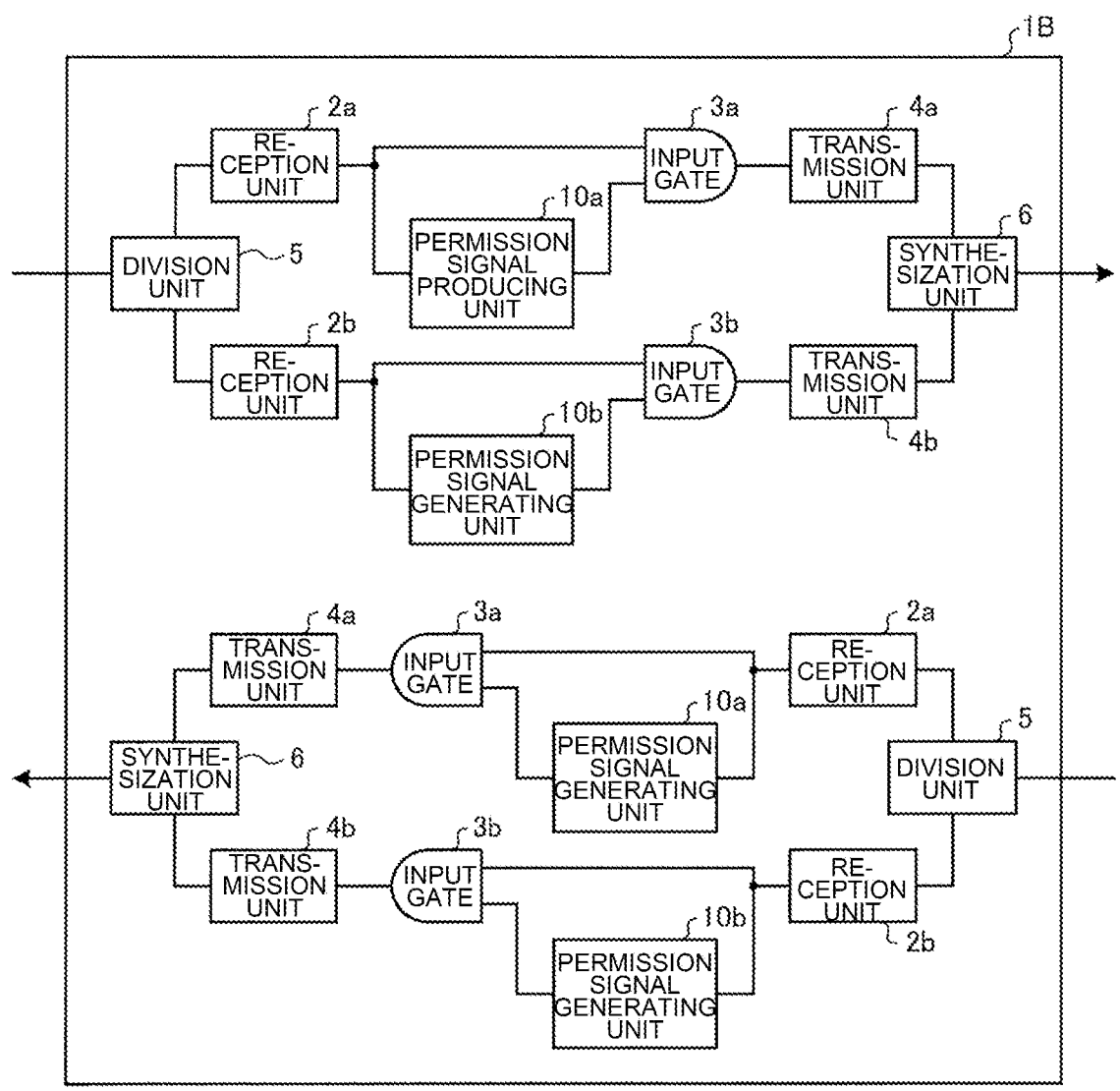
FIG. 14 is a block diagram illustrating an example of the configuration of another repeater according to Embodiment 2.

It should be noted that the repeater according to Embodiment 2 is not limited to the repeater 1A as illustrated in FIG. 12. FIG. 14 is a block diagram illustrating an example of the configuration of a repeater 1B according to Embodiment 2. For example, as illustrated in FIG. 14, instead of the reception/division unit 2A of the repeater 1A, a division unit 5 and reception units 2a and 2b may be provided, and instead of the synthesization/transmission unit 4A, transmission units 4a and 4b and a synthesization unit 6 may be provided. The repeater 1B having such a configuration can operate as the repeater 1A.

In this case, the division unit 5 divides a bipolar received pulse signal into an upper received pulse signal and a lower received pulse signal. Furthermore, the reception units 2a and 2b operate for the upper received pulse signal and the lower received pulse signal, respectively, in the same manner as the reception unit 2 of Embodiment 1. The transmission units 4a and 4b operate for the upper transmission pulse signal and the lower transmission pulse signal, respectively, in the same manner as the transmission unit 4 of the Embodiment 1. The synthesization unit 6 synthesizes the upper transmission pulse signal and the lower transmission pulse signal to obtain a transmission pulse signal.

Embodiment 3

Next, Embodiment 3 of the present disclosure will be described. The following description concerning Embodiment 3 will be descried by referring to the case where the above repeater 1 is applied to an air-conditioning system. In the air-conditioning system according to Embodiment 3, signals are transmitted/received between a plurality of air-conditioning apparatuses.

[Configuration of Air-Conditioning System 100]

Figure 15:
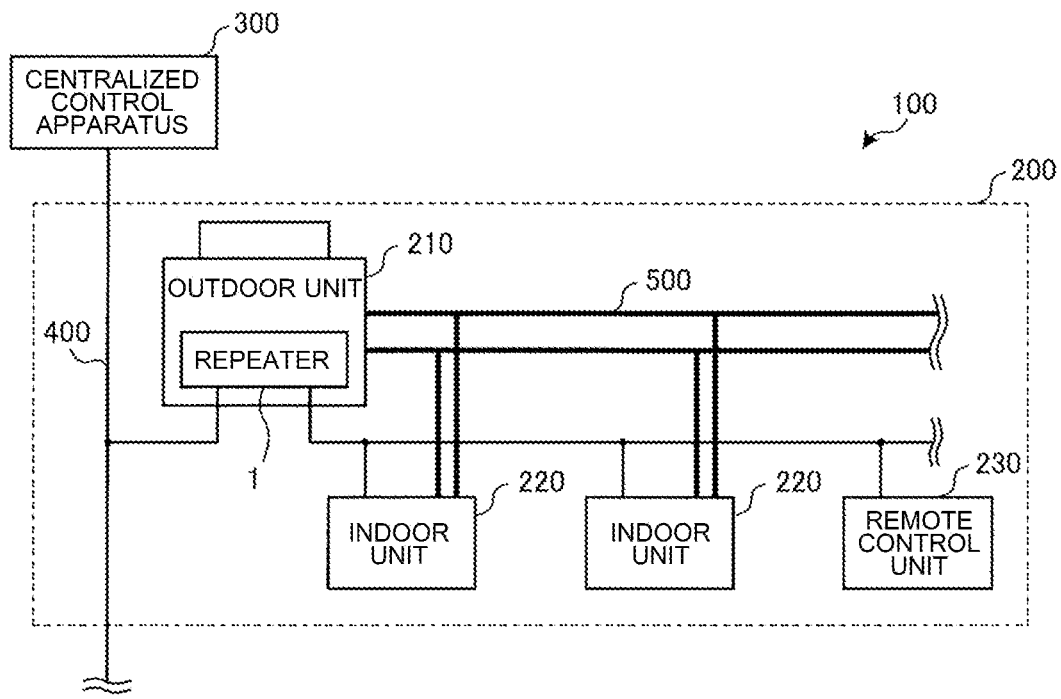
FIG. 15 is a block diagram illustrating an example of the configuration of an air-conditioning system according to Embodiment 3.

FIG. 15 is a block diagram illustrating an example of the configuration of an air-conditioning system 100 according to Embodiment 3. As illustrated in FIG. 15, the air-conditioning system 100 includes an air-conditioning apparatus 200 and a centralized control apparatus 300, which are connected to each other by a transmission line 400. It should be noted that the configuration of the air-conditioning system 100 is not limited to the example of the configuration as illustrated in FIG. 15, and the air-conditioning system 100 may include a plurality of air-conditioning apparatuses 200.

The centralized control apparatus 300 sends/receives various kinds of data to/from the air-conditioning apparatus 200 by the transmission line 400, to thereby manage and control the air-conditioning apparatus 200. For example, the centralized control apparatus 300 receives information indicating the state of the air-conditioning apparatus 200 and transmits a control signal for controlling the air-conditioning apparatus 200 through the transmission line 400.

The air-conditioning apparatus 200 receives the control signal, which includes, for example, a control command and is transmitted from the centralized control apparatus 300, through the transmission line 400, and performs an air-conditioning operation on the basis of the received control signal. Furthermore, at the time when the air-conditioning apparatus 200 operates, the air-conditioning apparatus 200 transmits a signal including data necessary for the centralized control apparatus 300 to perform control to the centralized control apparatus 300.

The air-conditioning apparatus 200 includes an outdoor unit 210, an indoor unit 220, and a remote control unit 230. The outdoor unit 210 and the indoor unit 220 are connected to each other by a refrigerant pipe 500, thereby forming a refrigerant circuit. It should be noted that although the air-conditioning apparatus 200 includes the one outdoor unit 210, the two indoor units 220, and the one remote control unit 230 in the example illustrated in FIG. 15, the configuration of the air-conditioning apparatus 200 is not limited to the configuration of this example. The number of outdoor units 210, the number of indoor units 220, and the number of remote control units 230 may be each set to an arbitrary number.

The outdoor unit 210 includes the repeater 1 as described with respect to Embodiment 1. The repeater 1 relays communication between the centralized control apparatus 300 and the air-conditioning apparatus 200, which are connected to each other by the transmission line 400, and communication between units provided in the air-conditioning apparatus 200.

As described above, in Embodiment 3, the repeater 1 is used in the air-conditioning system 100, and can thus relay communication between the air-conditioning apparatus 200 and the centralized control apparatus 300, and also communication between the units provided in the air-conditioning apparatus 200. It should be noted that although the above example is described above by referring to the case where the repeater 1 is used in the air-conditioning system 100, it is not limiting. For example, the repeaters 1A and 1B as described regarding Embodiment 2 can also be used in the air-conditioning system 100.

Figure 16:
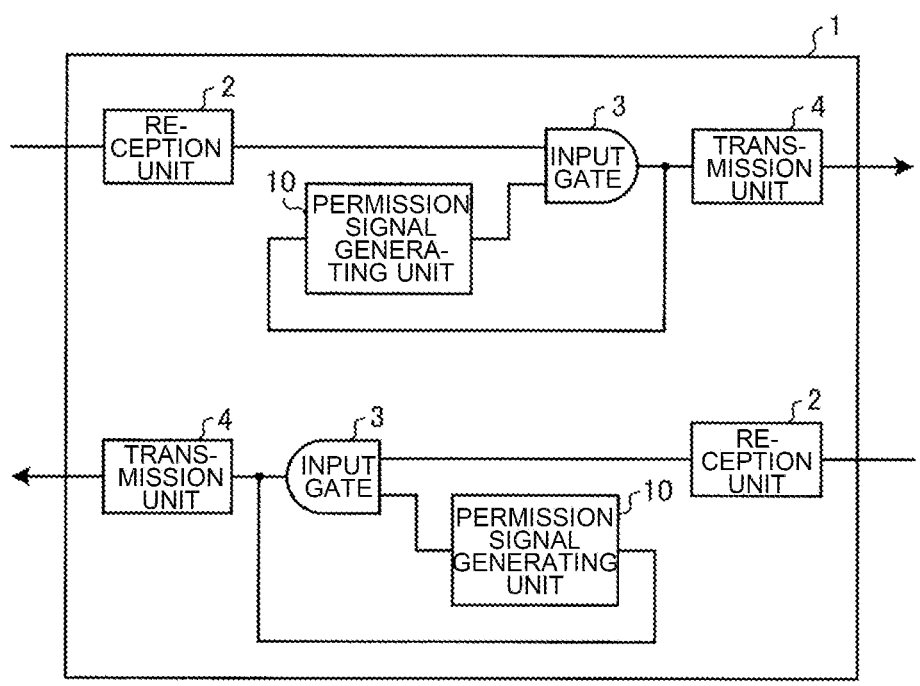
FIG. 16 is a block diagram illustrating another example of the configuration of the repeater.

Although the above description is made concerning Embodiments 1 to 3 of the present disclosure, it is not limiting. Various modifications and applications can be made without departing from the scope of the present disclosure. For example, the configuration of the repeater 1 is not limited to the configuration as illustrated in FIG. 1. FIG. 16 is a block diagram another example of the configuration of the repeater 1. As illustrated in FIG. 16, an output from an input gate 3 may be input to a permission signal generating unit 10. Such a circuit configuration also enable the repeater 1 to operate as in Embodiment 1.

Furthermore, although Embodiment 3 is described above while referring to the case where the repeater 1 is used in the air-conditioning system 100, the apparatus in which the repeater 1 is used is not limited to the air-conditioning apparatus; that is, the repeater 1 can be used in any apparatus as long as communication is relayed therein.

REFERENCE SIGNS LIST 1, 1A, 1B repeater 2, 2a, 2b reception unit 2A reception/division unit 3, 3a, 3b input gate 4, 4a, 4b transmission unit 4A synthesization/transmission unit 5 division unit 6 synthesization unit 10, 10a, 10b permission signal generating unit 11 latch reset control unit 12 latch circuit 13 clock generator 100 air-conditioning system 111 state machine 112 timer 200 air-conditioning apparatus 210 outdoor unit 220 indoor unit 230 remote control unit 300 centralized control apparatus 400 transmission line 500 refrigerant pipe

The invention claimed is:

1. A repeater comprising:
a reception unit configured to receive a signal in the form of pulses;
a permission signal generating unit configured to detect a state of the pulses of the signal, and generate a permission signal that permits a relay of the signal when the permission signal generating unit detects the pulses, and that inhibits the relay of the signal when the permission signal generating unit detects an end of the pulses; and
a transmission unit configured to transmit the signal during a time period permitted by the permission signal,
wherein the permission signal generating unit is configured to:
set, when detecting the end of the pulses, a pulse re-input monitoring period for the permission signal, the pulse re-input monitoring period being a time period provided to determine whether or not pulses of the signal are re-detected; and
determine that the signal continues when detecting the pulses of the signal during the pulse re-input monitoring period, and determine that the signal ends when not detecting the pulses of the signal during the pulse re-input monitoring period.

2. The repeater of claim 1, wherein
the reception unit is configured to divide, when the received signal is bipolar, the signal into signals having different polarities,
the permission signal generating unit is configured to generate the permission signal for each of the signals having different polarities, and
the transmission unit is configured to synthesize the signal received during the time period permitted by the permission signal for one of the signals and the signal received during the time period permitted by the permission signal for an other of the signals, thereby obtaining a single signal, and then output the obtained single signal.

3. The repeater of claim 1, wherein the permission signal generating unit includes:
   a latch reset control unit configured to generate a reset signal based on a result of determining the state of the pulse; and
   a latch circuit configured to generate the permission signal based on the pulses and the reset signal, and output the permission signal.

4. The repeater of claim 3, wherein the latch reset control unit includes:
   a state machine configured to determine the state of the pulses; and
   a timer configured to count down in the pulse re-input monitoring period.

5. The repeater of claim 1, further comprising a gate circuit configured to calculate a logical product of a signal output from the reception unit and the permission signal generated by the permission signal generating unit.

6. The repeater of claim 5, wherein the permission signal generating unit generates the permission signal based on an output from the gate circuit.

7. The repeater of claim 1, wherein the pulse re-input monitoring period is set to fall within a range of 0.1 μs to 10 μs.

8. The repeater of claim 1, wherein the permission signal generating unit is configured to set, for the permission signal, a time-out time in which the relay is inhibited after the pulse re-input monitoring period.

9. A relay method for a repeater, comprising:
   receiving a signal in the form of pulses;
   detecting a state of the pulses of the signal, and generating a permission signal that permits a relay of the signal when the pulses are detected, and that inhibits the relay of the signal when an end of the pulses is detected; and
   transmitting the signal received during a period permitted by the permission signal,
   wherein in a case of generating the permission signal,
   when the end of the pulses is detected, a pulse re-input monitoring period provided to determine whether or not the pulses of the signal are re-detected is set for the permission signal, and
   when the pulses of the signal are detected during the pulse re-input monitoring period, it is determined that the signal continues, and when the pulses of the signal are not detected during the pulse re-input monitoring period, it is determined that the signal ends.

* * * * *